No. 880,303. PATENTED FEB. 25, 1908.
F. A. HETHERINGTON.
BUCKET ELEVATOR.
APPLICATION FILED APR. 26, 1907.
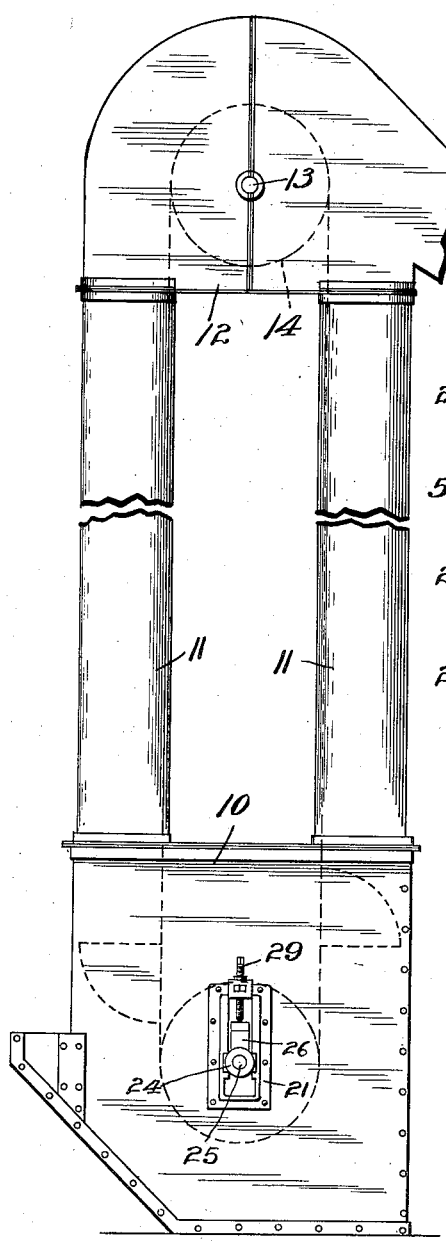
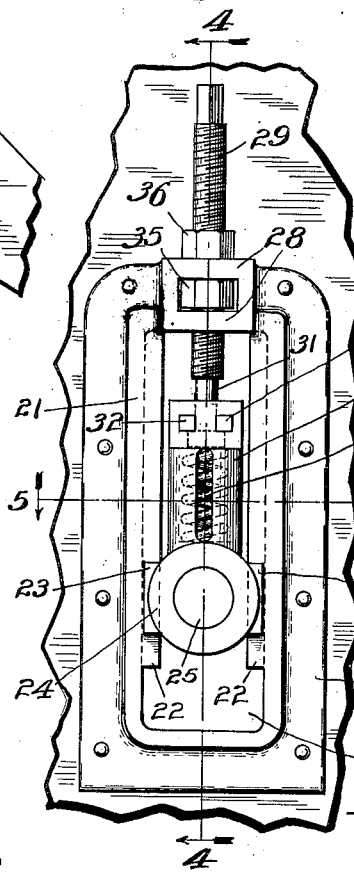
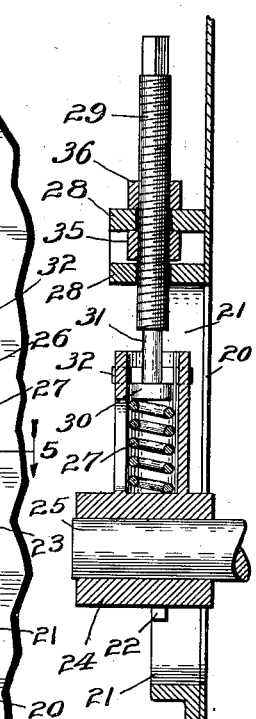
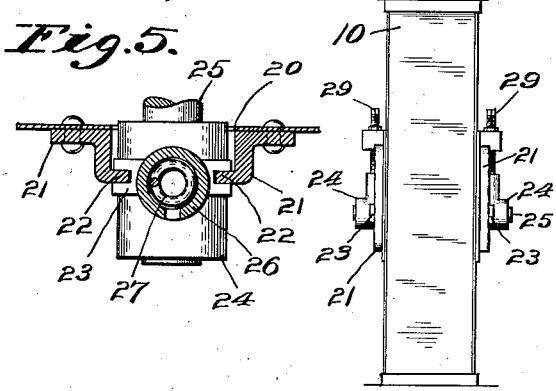
Witnesses
Frank A. Fahle
Thomas W. McMeans
Inventor
Frederick A. Hetherington
By Bradford & Hood
Attorneys cation.
UNITED STATES PATENT OFFICE.

FREDERICK A. HETHERINGTON, OF INDIANAPOLIS, INDIANA.

BUCKET ELEVATOR.

No. 880,303.　　　　Specification of Letters Patent.　　　　Patented Feb. 25, 1908.

Application filed April 26, 1907. Serial No. 370,350.

*To all whom it may concern:*

Be it known that I, FREDERICK A. HETHERINGTON, a citizen of the United States, residing at Indianapolis, in the county of Marion and State of Indiana, have invented certain new and useful Improvements in Bucket Elevators, of which the following is a specification.

In the operation of plants for preparing materials for plastic pavements, the sand, rock, etc., is preliminarily heated to a fairly high temperature and then carried by an elevator to a storage bin from which it may be delivered in such quantities as may be desired, to the mixing mechanism. The elevators used for this purpose are generally of the endless belt type and, as the belts become heated during the early hours of the operation of the plant, they elongate and no longer properly fit the pulleys over which they run.

It has heretofore been common to provide adjusting mechanism by means of which the distance between supporting pulleys can be varied, but when such adjustments are made in order to accommodate the lengthened belt or chain, the operators will ordinarily forget to retract the adjustment when the plant is shut down, and consequently, when the parts become cool, breakage or improper strains result.

The object of my present invention is to produce an elevator structure capable of automatically compensating for variations in length of the belt.

The accompanying drawings illustrate my invention.

Figure 1 is a side elevation of the elevator structure embodying my invention; Fig. 2 an end elevation of the lower or receiving boot; Fig. 3 an enlarged detail of my device; Fig. 4 a section on line 4—4 of Fig. 3, and Fig. 5 a section on line 5—5 of Fig. 3.

In the drawings 10 indicates a boot-casing, 11, 11 the tubular uprights and 12 the head casing, all of any well known form and construction. Journaled in the head casing 12 is a shaft 13 which supports a driving sprocket 14 (shown in dotted lines in Fig. 1) and over this driving sprocket is arranged an ordinary endless elevator chain or belt provided with suitable elevator buckets, as indicated in dotted lines in Fig. 1.

The boot casing 10 is provided at each side with a vertical slot 20 which is surrounded by a suitable frame 21, said frame 21 being provided with vertical opposed flanges 22 adapted to be received between the ears 23 of a bearing box 24, adapted to serve as a bearing for the idler-shaft 25 which carries the idler pulley (shown in dotted lines in Fig. 1) to engage and support the endless chain at its lower bight. Boxing 24 is provided with an upwardly extending tubular portion 26 within which is mounted a suitable compression spring 27, the lower end of which rests upon the bottom of the tube 26. At the upper end of the flanges 22 the frame 21 is provided with a pair of horizontal vertically-separated cross bars 28 through which is passed a vertical adjusting screw 29. Screw 29 is provided at its lower end with a head 30 and a small portion 31 immediately above the head, the construction being such that head 30 may be inserted in the upper end of tube 26 so as to engage the upper end of spring 27. In order to prevent the withdrawal of head 30 from tube 26 I project a pair of keys 32 transversely through the sleeve 26 above the head 30. In order to avoid the necessity and expense of threading the cross bars 28, I make the screw 29 of a standard size and thread and place between the cross bars 28 a nut 35, said nut being prevented from turning by the adjacent vertical portions of the frame 21, and vertical movement being prevented by the two bars 28. Threaded upon screw 29 above the upper bar 28 is a check-nut 36. As the chain becomes elongated by heat, the screws 29 are adjusted downward so as to carry shaft 25 downward and keep its pulley sufficiently tight within the lower bight of the chain, this adjustment being accomplished without any material compression of springs 27. When the apparatus cools and the chain shortens, the shaft 25 is free to yield upwardly by compressing the springs 27 so that no injurious stresses are produced and, when the plant is again started and the chain becomes gradually heated the springs will automatically compensate for the elongation.

I claim as my invention:—

1. The combination, with an elevator-casing, of a pair of supporting-wheels mounted one in each end thereof, a pair of journal bearings for the shaft of one of said wheels, a tubular sleeve carried by each of said journal bearings substantially at right angles to the bearing, a compression spring mounted in said sleeve, and an adjustable abutment mounted on the casing and adapted to enter said sleeve and have a relative longitudinal movement therein against the spring.

2. The combination, with an elevator casing, of a pair of supporting-wheels mounted one in each end thereof, a pair of journal bearings for the shaft of one of said wheels, a tubular sleeve carried by each of said journal bearings substantially at right angles to the bearing, a compression spring mounted in said sleeve, an adjustable abutment mounted on the casing and adapted to enter said sleeve and have a relative longitudinal movement therein against the spring, and means for preventing withdrawal of the sleeve from the abutment.

3. The combination, with an elevator casing, of a frame 21 carried at each side thereof and each provided at one end with a pair of separated cross bars, a nut arranged between said bars and held against rotation, a threaded rod passing through said nut, a journal bearing having a tubular portion adapted to receive the adjacent end of said threaded rod, a compression spring arranged in said tubular portion beneath the inserted end of the threaded rod, a carrier-supporting wheel carried by said journal bearings within the casing, a second carrier-supporting wheel also supported within the casing, and an endless carrier mounted upon said wheels, all substantially as and for the purpose set forth.

4. The combination, with an elevator casing, of a frame 21 carried at each side thereof and each provided at one end with a pair of separated cross bars, a nut arranged between said bars and held against rotation, a threaded rod passing through said nut, a journal bearing having a tubular portion adapted to receive the adjacent end of said threaded rod, a compression spring arranged in said tubular portion beneath the inserted end of the threaded rod, means for normally preventing withdrawal of the sleeve from the rod, a carrier-supporting wheel carried by said journal bearings within the casing, a second carrier-supporting wheel also supported within the casing, and an endless carrier mounted upon said wheels, all substantially as and for the purpose set forth.

In witness whereof, I, have hereunto set my hand and seal at Indianapolis, Indiana, this twenty-second day of April, A. D. one thousand nine hundred and seven.

FREDERICK A. HETHERINGTON. [L. S.]

Witnesses:
ARTHUR M. HOOD,
THOMAS W. McMEANS.